United States Patent
Vidrio et al.

(10) Patent No.: US 7,086,482 B1
(45) Date of Patent: Aug. 8, 2006

(54) RECOVERY OF HYDROCARBONS IN OIL WELLS BY INJECTION OF TREATED INERT GASES OBTAINED FROM THE INDUSTRIAL EFFLUENCE

(75) Inventors: César Anatolio Garcia Vidrio, Naucalpan (MX); Denzil Cotera Vazquez, Macuspana (MX); Heberto Ramos Rodriquez, Villahermosa (MX)

(73) Assignee: Cementos Apasco S.A. de C.V., Distritó Federal (MX)

( * ) Notice: Subject to any disclaimer, the term of this patent is extended or adjusted under 35 U.S.C. 154(b) by 0 days.

(21) Appl. No.: 09/857,570

(22) PCT Filed: Nov. 19, 1999

(86) PCT No.: PCT/IB99/01843

§ 371 (c)(1),
(2), (4) Date: Sep. 17, 2001

(87) PCT Pub. No.: WO00/34198

PCT Pub. Date: Jun. 15, 2000

(30) Foreign Application Priority Data

Dec. 7, 1998 (MX) .................................... 9810320

(51) Int. Cl.
*E21B 43/22* (2006.01)
(52) U.S. Cl. .................................................... 166/401
(58) Field of Classification Search ............. 166/244.1, 166/266, 267, 268, 400, 401, 402, 272.1
See application file for complete search history.

(56) References Cited

U.S. PATENT DOCUMENTS

| | | | |
|---|---|---|---|
| 3,873,238 A | 3/1975 | Elfarr | 417/54 |
| 3,892,270 A | 7/1975 | Linquist | 166/251 |
| 4,025,235 A | 5/1977 | Newbrough | 417/54 |
| 4,113,017 A | 9/1978 | Hitzman | |
| 4,267,885 A | 5/1981 | Sanderflrd | 166/250 |
| 4,313,500 A | 2/1982 | Johnson, Jr. et al. | |
| 4,480,697 A | 11/1984 | Goldaniga | 166/372 |
| 4,546,829 A * | 10/1985 | Martin et al. | 166/267 |
| 4,649,994 A | 3/1987 | Chaudot | 166/68 |
| 4,713,185 A | 12/1987 | Howard et al. | |
| 5,105,889 A | 4/1992 | Misikov | 166/372 |
| 5,133,406 A * | 7/1992 | Puri | 166/266 |
| 5,219,544 A | 6/1993 | Kupper et al. | |
| 5,439,054 A | 8/1995 | Chaback et al. | |
| 5,725,054 A * | 3/1998 | Shayegi et al. | 166/263 |

FOREIGN PATENT DOCUMENTS

| | | |
|---|---|---|
| DE | 195 11 304 | 10/1996 |
| WO | WO 98/20233 | 5/1998 |

* cited by examiner

*Primary Examiner*—John Kreck
(74) *Attorney, Agent, or Firm*—Kevin E. Joyce

(57) ABSTRACT

A process of recovering hydrocarbons in oil wells by the injection of treated inert gases from cement clinker production effluence(s) comprising the steps of treating the effluence(s) to make the effluence(s) compatible with the hydrocarbons and injecting the treated effluence(s) into the wells.

3 Claims, 2 Drawing Sheets

RECOVERY OF HYDROCARBONS IN OIL WELLS BY INJECTION OF TREATED INERT GASES OBTAINED FROM THE INDUSTRIAL EFFLUENCE

This application is the National Phase of International Application PCT/IB99/01843 filed Nov. 19, 1999 which designated the U.S. and that International Application was published under PCT Article 21(2) in English.

BACKGROUND OF THE INVENTION

1. Field of the Invention

The present invention relates to improvements in the process of recovering hydrocarbons in oil wells by injection of treated inert gases obtained from industrial effluence. Particularly it refers to a process of recovering hydrocarbons in oil wells by injection of treated inert gases obtained from the process of cement clinker production.

2. Prior Art

Fossil fuels have successfully been burned in furnaces for a long time. Nevertheless, the possible reduction or minimization of air contamination is more and more being emphasized recently. In this aspect it is known that there is environmental contamination due to toxic substances. Environmental contamination also arises from substances or materials that contribute to the global warming, such as $CO_2$ for example.

Oil well production is classified in free-flowing and artificial production. With the first, hydrocarbons gush to the outside by natural energy, which can be hydraulic pressure or the inherent gas pressure of the deposit. Artificial oil well production or oil well production by pumping is an exploitation system applied, if the inherent pressure of the deposit is not sufficient for the oil to flow up to the surface.

In the past, oil wells, which were not flowing by inherent energy, were abandoned, thus generally recovering 20% of the total reserves. With the perfection of the exploitation methods, however, the recovering of hydrocarbons found in these oil deposits was increased. Actually, if an oil well stops flowing, artificial exploiting methods are applied such as pneumatic, mechanical or hydraulic pumping.

Additionally, there exist systems, which improve the recovery by the injection of natural gas, nitrogen, carbon dioxide or water into the deposit. These systems proved to considerably increase the recovery of hydrocarbons at the deposits, making said recovering process more efficient, additionally increasing the production capacity of the deposits and allowing a reasonable exploitation of the oil resources. On the other hand, the costs for production and preparation of said gases are rather considerable.

Hydrocarbon recovery by injection of inert gases is already known for exhausted oil wells. The following patents show endeavors for its realization and as a reference their specifications are incorporated.

U.S. Pat. No. 3,873,238 with the tittle "Method and apparatus for flowing crude oil from a well" of Johnnie A. Elfarr, granted on Mar. $25^{th}$, 1975 relates to a method and apparatus for flowing crude oil from wells wherein a fluid is injected into the oil bearing earth formation for the purpose of reducing the viscosity of the oil and causing it to migrate under induced formation pressure to one or more production wells.

U.S. Pat. No. 3,892,270 with the title "Production of hydrocarbons from underground formations" of Robert H. Lindquist, granted on Jul. $1^{st}$, 1976 relates to a method for recovering hydrocarbons by injecting a mixture of oxidizing gas and steam into a lateral conduit of a hydrocarbon-containing formation to produce a product gas and, based on values contained in such gas, controlling the reactions between mixtures of oxidizing gas and steam and hydrocarbons in the formation to optimize the Kilocalories value (BTU) of the product gas.

In U.S. Pat. No. 4,267,885 with the title "Method and apparatus for optimizing production in a continuous or intermittent gas-lift well" of Dorsey W. Sanderford, granted on May $1^{st}$, 1981 the temperature of the fluid is sensed at the wellhead and used to determine the injection parameter values to optimize well production. In one embodiment, a process control unit is programmed according to the inventive method to interpret the temperature data and to control the gas control valve in order to optimize production.

U.S. Pat. No. 4,025,235 with the title "System for improving oil well production" of Joseph S. Newbrough, granted on May $24^{th}$, 1977 relates to a system utilizing intermittent build-up and release of gas pressure in the annulus between the casing and tubing in an oil well with an inert gas interface between the gas and the producing fluid.

U.S. Pat. No. 4,480,697 with the title "Method and apparatus for converting an oil well to a well with effluent raising by gas lift" of Rene F. Goldaniga, Geard Walter, G. W. Walter, Bernard J. P. Glotin and Daniel Gallois, granted on Nov. $6^{th}$, 1984 relates to a method of and apparatus for converting an oil well with natural effluent rise to one with gas-lift of the effluent column, wherein the oil well has a nipple in the production tube provided with a stop-groove and smooth bearing surfaces between which a hydraulic control line comes out.

U.S. Pat. No. 4,649,994 with the title "Installation for bringing hydrocarbon deposits into production with reinjection of effluents into the deposit or into the well or wells" of Gerard Chaudot, granted on Mar. $17^{th}$, 1987 relates to an installation for bringing into production hydrocarbon deposits with reinjection of effluents into the deposit or into the well or wells and a process for using this installation. Said installation comprises at least one sealed casing, the base of which communicates with the deposit; at least one sealing plug disposed in the lower part of the casing and forming a capacity; at least one duct for either injecting or removing a pressurized gas; a condensate injection pipe passing through the capacity and opening into the base of the casing beyond said plug, this pipe communicating with the inner volume of the casing downstream of the plug, as well as with said capacity through a valve system.

U.S. Pat. No. 5,105,889 with the title "Method of production of formation fluid and device for effecting thereof" of Taimuraz K. Misikov, Vladimir M. Shaposhnikov and Alexandr P. Skripkin granted on Apr. $21^{th}$, 1992 relates to a method of production of the formation fluid, which is used in wells with a low formation pressure. The method consists in that the gas is dissolved in the well from a flow of the formation fluid forcedly liberated, whereupon the formation fluid is transformed into a finely dispersed gas-liquid flow in which the amount of liberated gas ensures self-lift of the formation fluid to the wellhead.

WO98/20233A2 with the title "FLUID SEPARATION AND REINJECTION SYSTEMS FOR OIL WELLS" of Christopher K. Shaw published on May $14^{th}$, 1998 relates to a fluid separation and reinjection system for use in a wellbore extending through a production zone producing an oil/water mixture and a water reinjection zone, which comprises a tubing disposed within the wellbore in fluid communication with the production zone defining an oil flow channel and in fluid communication with the water reinjection zone defining a water reinjection channel.

Neither the references cited above nor the literature to the best knowledge of the inventors reveal the possibility of utilizing industrial effluence and in particular inert gases from the burning of clinker for the recovery of hydrocarbons from exhausted oil wells.

SUMMARY OF THE INVENTION

An object of the present invention is to recover hydrocarbons from exhausted oil wells by treated inert gases, which arise from the effluence (escape chimney gases) of industrial waste. The inert gases are mostly composed of nitrogen and carbon dioxide.

Another object of the present invention is to utilize the emission gases of the combustion and calcination in production processes, in particular in the processes of the cement clinker production.

Another object of the present invention is to utilize emission gases of the combustion of materials such as fossil fuel (oil, gas and coal) or alternative fuels such as waste tires and waste wood, etc.

Another object of the invention is the reduction of the contamination level of cement clinker production processes.

The invention has as additional object the treatment of combustion gases in order to utilize them in other processes in which certain of their components are used.

Another object of the invention is to reduce contamination of cement clinker production.

The present invention relates to improvements in the process of recovering hydrocarbons in oil wells. The recovering of hydrocarbons is realized by the injection of treated inert gases of one or various industrial effluences. Actually, the improvements of the process consist in treating the industrial effluence by operations appropriate to make constituents and parameters such as for example temperature, concentration, pressure and/or expenditure of the industrial effluence compatible with the hydrocarbons of the deposit and regulating the distribution of different types of gases from their place of origin.

In one embodiment of the invention the industrial effluences were selected from combustion and/or calcination gases from production processes.

Some examples for the operations used for the invention are adsorption, separation of dust, condensation, liquefaction and distillation, compression and distribution. These operations, which are known in detail to those who are skilled in the art, are not described in the present specification for reasons of simplicity.

The inert gases according to the invention comprise a mixture of $N_2$ and $CO_2$ with a percentage of 75 to 85 and 15 to 25%, such that the sum results in 100%.

It has been found that in order to make the constituents compatible it is particularly advantageous to augment the concentration of $N_2$ in the injection gases taking a part of the air coming from the chimney.

By the present invention it is possible to recycle water and oxygen.

Surprisingly it was found that by the present invention the contamination of the cement clinker production was reduced.

BRIEF DESCRIPTION OF THE DRAWINGS

A number of objects of the invention have been mentioned above. Other objects and advantages of the invention will appear according to the progress of the invention by taking into account the following drawings, in which an example of the best way of the invention is illustrated. Taking into account the figures of the drawings

DETAILED DESCRIPTION OF PREFERRED EMBODIMENTS OF THE INVENTION

Figure 1:
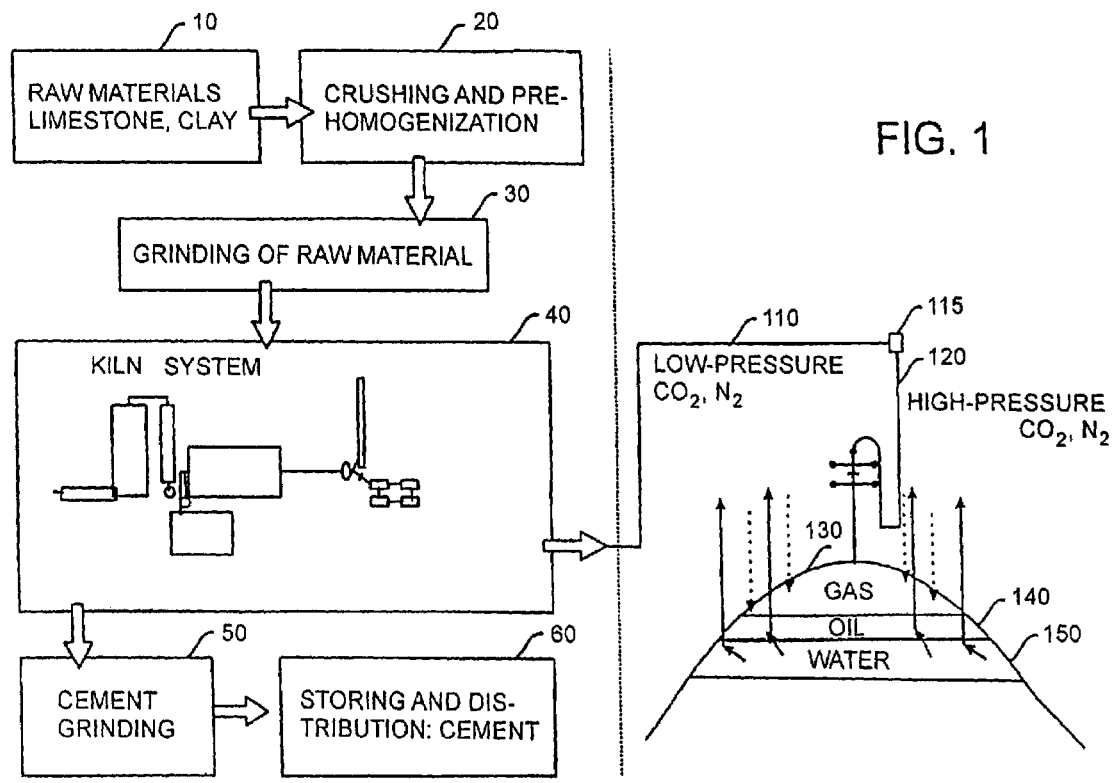
FIG. 1 is a schematic diagram of the process according to the present invention, which includes both the cement process and the process of the oil deposit
Figure 2:
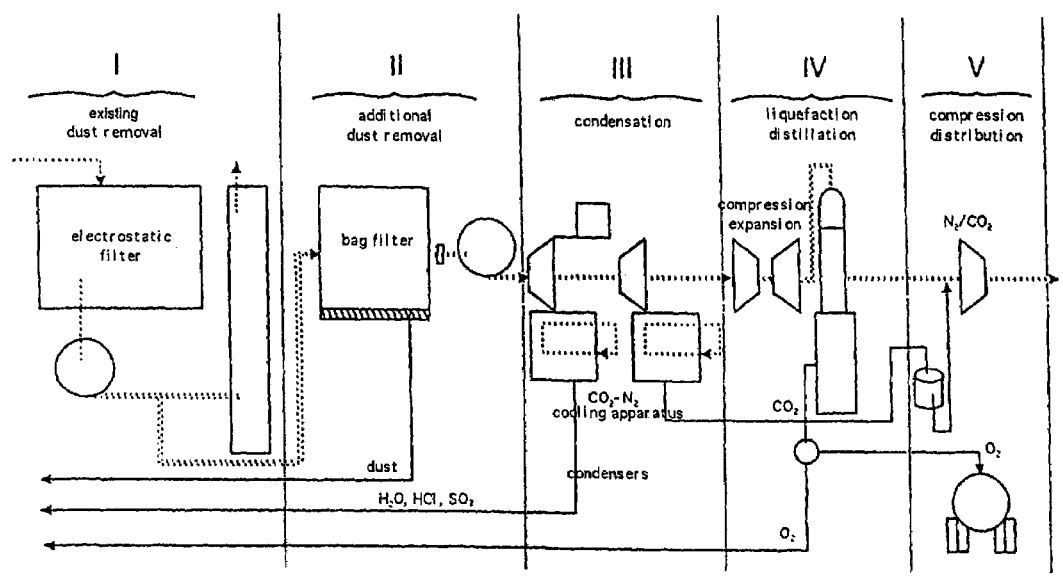
FIG. 2 is a schematic diagram of the conditioning of the combustion gases in the cement process for the injection into the oil deposit.

With reference to the figures a first embodiment is shown in FIG. 1 and FIG. 2. The invention follows the part of the cement process, where as raw materials limestone and clay are fed (10) to a step of crushing and prehomogenization (20) whereupon follows a step of grinding the raw material (30). The ground raw material is supplied to a kiln system (40), wherefrom it is proceeded on the one hand to cement grinding (50) and thereupon to storage and distribution of the cement (60). On the other hand low-pressure $CO_2$ and $N_2$ (110) as effluence pass through a compressor (115) in order to produce high-pressure $CO_2$ and $N_2$ (120) for supplying them to the oil deposit, in which the gas phases (130), oil (140) and water (150) are found.

As is illustrated in FIG. 2 the conditioning of the gases in the cement process comprises in a particular embodiment a step of existing dedusting, a step of additional dust removal, a step of condensation, wherefrom $H_2O$, HCl, $SO_2$ are recycled, a step of liquefaction and distillation with $CO_2$ and $O_2$, which can be recycled and a final step of compression and distribution of $N_2$ and $CO_2$. This structure or configuration is preferred for the present application but may not be necessary for other applications.

DESCRIPTION OF AN EXAMPLE INCLUDING THE BEST MODE OF THE INVENTION

The demand for inert gases for recovering hydrocarbons in the oil deposits in the region of the south of Mexico is approximately 16 million m³/day (564 million cubic feet/day). This volume being required a net of distribution ducts is envisaged from various potential sources in order to inject gases into the oil deposits considering the gas-producing sources near the oil deposits having supplying potential. The potential sources are shown in table 1.

TABLE 1

Potential sources of gas injection into oil deposit in the Southeast region.

| Sources | Inert gas | Ntcfd | Ncmd | % |
|---|---|---|---|---|
| Apasco, Mucaspana | $CO_2$, $N_2$ | 148 344 | 4 200 000 | 26 |
| Campo Carmito | $CO_2$ | 80 000 | 2 264 000 | 14 |
| Petroquimicas | $CO_2$ | 100 000 | 2 830 000 | 18 |
| Apasco, Orizaba | $CO_2$ $N_2$ | 235 656 | 6 669 065 | 42 |
| Total potential | | 564 000 | 15 961 200 | 100 |

Ntcfd: Normalized (0° C., 1 atm) thousand cubic feet per day;

Ncmd: Normalized (0° C., 1 atm) cubic meter per day

The table shown above indicates the total distribution of the injection gases required for all oil deposits in the Southeast oil exploiting region with the supply of a number of near sources producing inert gases.

It should be evident, that the requirements of the inert gases will vary from one oil deposit to another, the parameters like pressure and temperature of the gas supply will have to be considered and that the distribution of the producing sources of different types of gases will be a function of the compatibility of these gases with the hydrocarbons of the deposit.

A number of details of the invention can be changed without going beyond the scope of the invention. Additionally, the above description of the preferred embodiment of the invention and the best way for carrying out the invention is proposed merely for the intention of illustration and not for the intention of limitation. The invention is defined only by its claims.

The invention claimed is:

1. A process for recovering hydrocarbons in oil well deposits and for reducing contamination in cement clinker production, comprising:

subjecting effluences in the form of combustion and/or calcining gases of cement clinker production to at least one of the steps of adsorption, separation of dusts, condensation, liquefaction, distillation and compression;

mixing effluences from the combustion of fuel and effluences from calcining limestone to an extent that a percentage of $N_2$ and $CO_2$ of 75 to 85% and 15 to 25%, respectively, is obtained such that the sum of both percentages is 100%;

adjusting the temperature, concentration, pressure and/or volume of the effluences in order to obtain treated inert gases compatible with hydrocarbons of the deposits; and injecting said treated gases into said oil well deposits.

2. A process according to claim 1, wherein water and oxygen are recycled.

3. A process according to claim 1 or 2, wherein said combustion and/or calcining gases result from the combustion of materials selected from the group consisting of fossil fuel (oil, gas and coal) or alternative fuels including waste tires and waste wood, and combinations thereof.

* * * * *